July 11, 1961

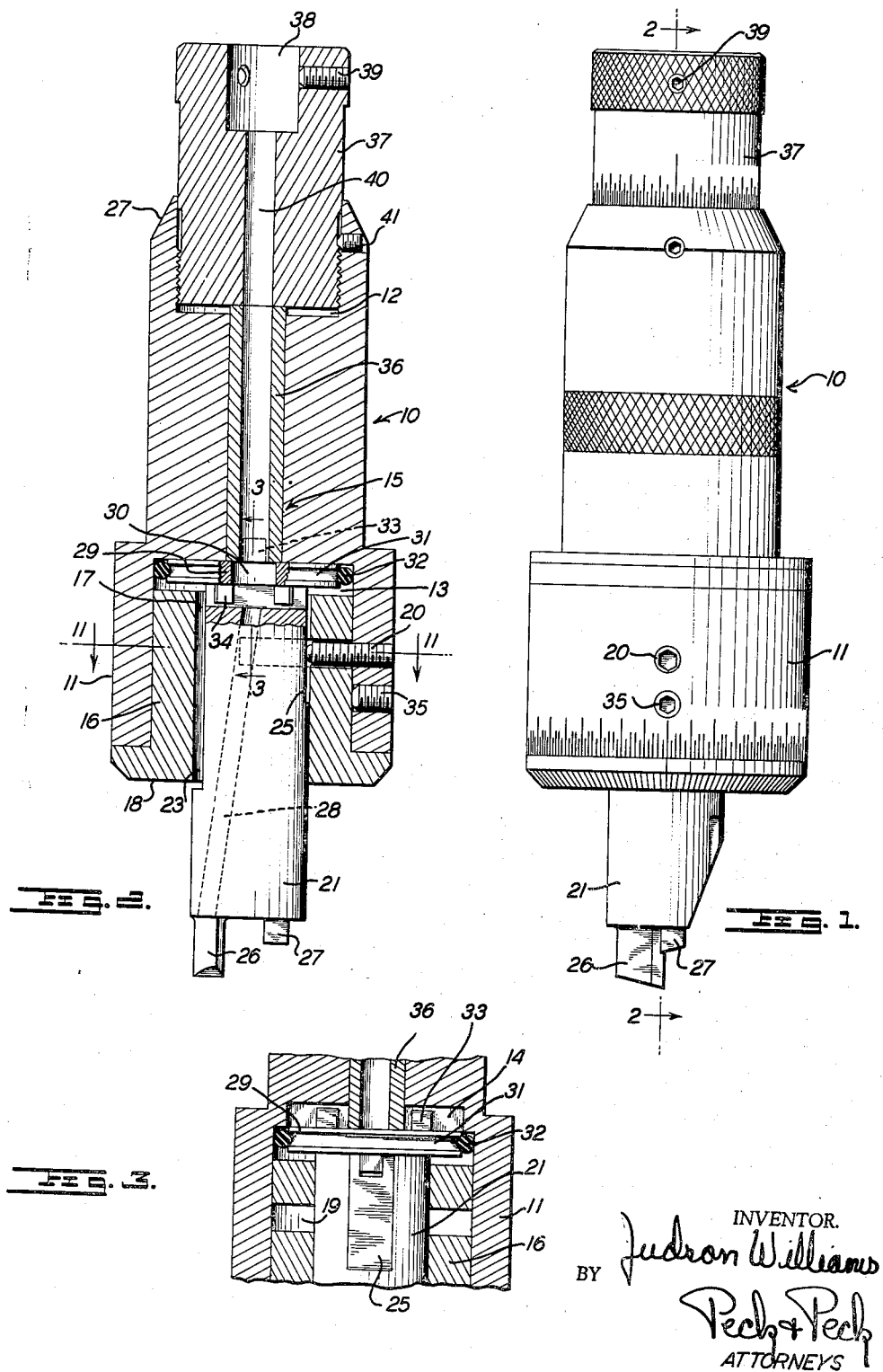

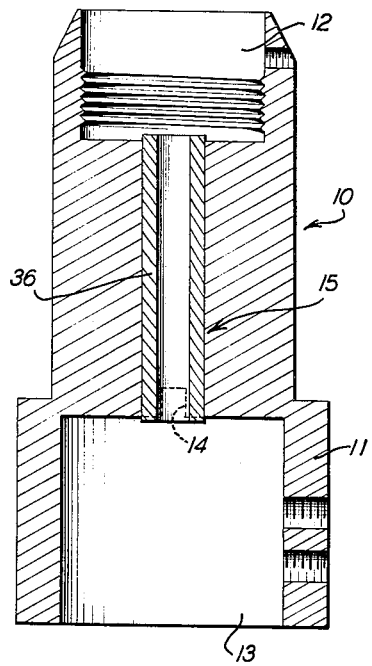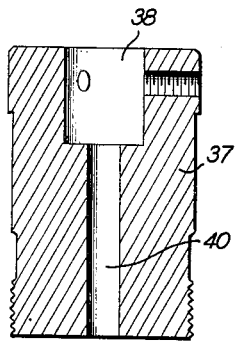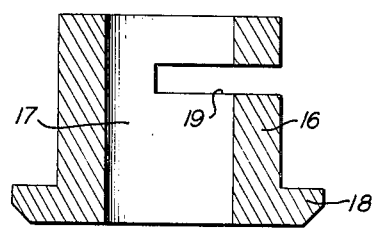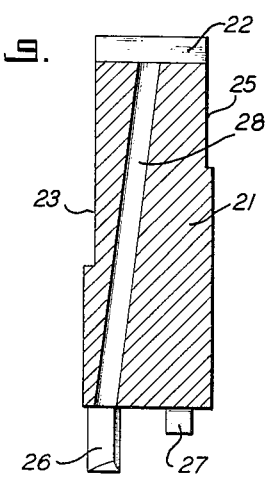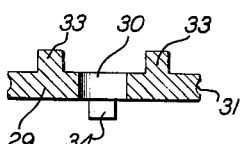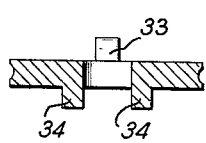

J. WILLIAMS 2,991,667

BORING TOOL

Filed July 23, 1958

INVENTOR.
Judson Williams
BY
Peck & Peck
ATTORNEYS

United States Patent Office 2,991,667
Patented July 11, 1961

2,991,667
BORING TOOL
Judson Williams, Cornwells Heights, Pa.
Filed July 23, 1958, Ser. No. 750,525
3 Claims. (Cl. 77—58)

This invention relates to an improved boring tool, the embodiment of the invention shown herein being more particularly adapted for use in connection with automatic boring machines. I do not, however, wish to be limited in this respect since, as will later appear herein, the tool may well be used as a boring device in connection with machines not of automatic character.

In the use of an automatic boring machine embodying a pentagon, for instance, the boring tool holders are, as will be understood, bolted to the pentagon, while the boring tools themselves are, in turn, bolted in the tool holders. It is thus necessary to loosen the bolts connecting the tool holders with the pentagon and insert shims beneath said holders in order to adjust the boring tools radially, while, in order to adjust the boring tools axially, it is necessary either to loosen the tool holders on the pentagon and shift them along the pentagon, or loosen the grip of the tool holders on the boring tools themselves so that the boring tools may themselves be adjusted axially in the holders. As will be appreciated, the foregoing adjusting operations may serve very well for roughly adjusting the boring tools but, in any instance where, for instance, precision is required to the final thousandth of an inch, such adjusting operations not only prove exceedingly time-consuming but also extremely difficult.

It is therefore one of the objects of the present invention to provide a boring tool wherein the cutter employed may, without loosening the holder of the tool on its pentagon, for instance, loosening the grip of the holder on the tool itself, be manually adjusted quickly and easily with precision, either axially or radially.

A further object of the invention is to provide a boring tool embodying self-contained manually operable mechanism for adjusting the cutter radially, and also self-contained manually operable mechanism for adjusting the cutter axially, and wherein either of said mechanisms may be selectively employed without affecting the adjusted position of the cutter produced by the other of said mechanisms.

And a still further object of the invention is to provide a tool wherein the cutter may be readily removed without changing the set position of either the radial or axial adjusting mechanism for the cutter, and wherein a fresh cutter may be readily installed to assume the exact set position formely occupied by the cutter removed.

Other and incidental objects will appear during the course of the following description of the invention, and in the drawings:

FIG. 1 is a view in elevation illustrating the boring tool of this invention.

FIG. 2 is a vertical sectional view taken on line 2—2 of FIG. 1.

FIG. 3 is a fragmentary view particularly illustrating the locking key in operative position.

FIG. 4 is a vertical sectional view of the body of the boring tool.

FIG. 5 is a vertical sectional view of the follower sleeve.

FIG. 6 is a vertical sectional view of the eccentric adjusting sleeve.

FIG. 7 is a view in section of the locking key.

FIG. 8 is a view in section of the locking key rotated 180° from the position illustrated in FIG. 7.

FIG. 9 is a vertical sectional view of the cutter.

Figure 13:
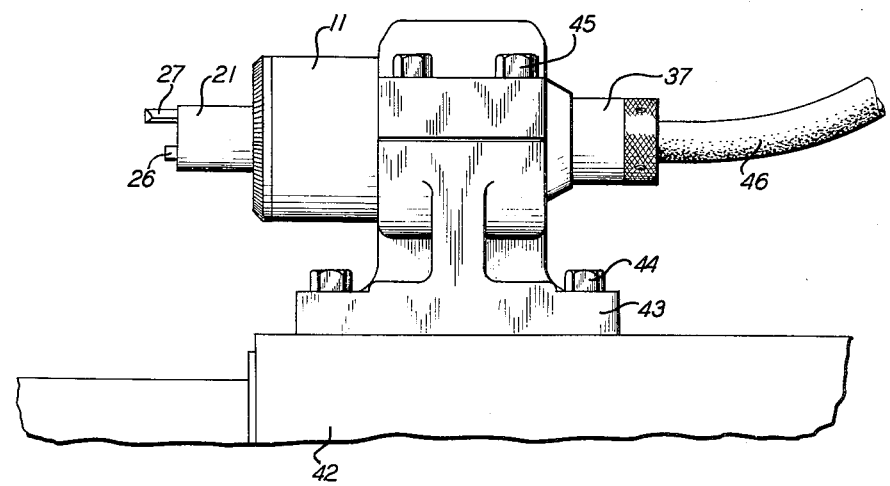
FIG. 13 is a view in elevation of the boring tool mounted in operative position on a conventional automatic boring machine.
Figure 10:
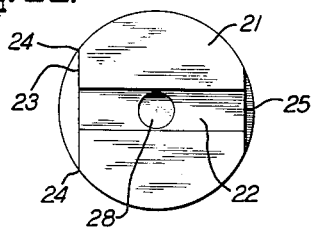
FIG. 10 is a top plan view of the cutter.
Figure 11:
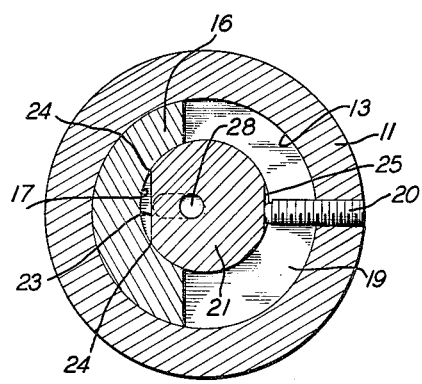
FIG. 11 is a view taken on line 11—11 of FIG. 2.

In carrying the invention into effect, I employ a cylindrical tool body 10 preferably beveled externally at its rear end and provided at its forward end with a head 11 of enlarged diameter. Formed in the rear end portion of the body is an axial chamber 12, and formed in the head 11 is an axial socket 13 somewhat greater in diameter than said chamber. Formed in the bottom wall of the socket 13 is a diametric slot 14, and extending between the chamber 12 and said socket is an axial bore 15.

Rotatably fitting in the socket 13 of the head 11 is an eccentric adjusting sleeve 16 having an eccentric bore 17 and formed at its forward end with a flange 18 overlying the forward end edge of the head. Formed through the wall of the sleeve is a circumferential slot 19 of a length to permit the sleeve to be rotatably adjusted a full half turn, and engaged through the wall of the socket 13 is a stop screw 20 extending into said slot. The stop screw will thus limit the rotation of the sleeve as well as serve to retain the sleeve in said socket and, as shown in the drawings, the flange 18 of the sleeve as well as the periphery of the head 11 may be provided with suitable graduations and other indicia to guide the operator in the adjustment of the sleeve. As will be noted, the screw 20 is provided with a flat inner end.

Removably fitting in the bore 17 of the sleeve 16 is a cylindrical cutter 21 provided at its inner end with a diametric slot 22 like the slot 14 in the bottom wall of the socket 13, and formed on the rear end portion of the cutter at one side thereof is an elongated flat 23, preferably a chord of a 90 degree arc, more or less, and which provides straight parallel edges 24 at the periphery of the cutter. At its opposite side the cutter is provided at its rear end portion with a flat 25 which, in comparison with the flat 23, is much shorter and narrower. However, the two flats lie parallel to each other. At its forward end the cutter is provided with one or more cutting prongs of a length and shape as well as radial and relative disposition on the cutter as may be required by the cutting operation to be performed. In the present instance I have shown the cutter as provided with a long cutting prong 26 and a shorter cutting prong 27. Formed through the cutter is a longitudinal duct 28 for conducting oil to the cutting prongs.

It is now to be observed that the stop screw 20 is employed to secure the cutter 21 in operative position in the bore 17 of the eccentric sleeve 16, and as the screw is tightened and the flat inner end thereof is caused to bind against the flat 25 of the cutter, the flat inner end of the screw will coact with said flat of the cutter in a manner tending to slightly rotate the cutter in either one direction or the other until said flat of the cutter seats flat against the flat inner end of the screw and thus locate the cutter in a given rotated position in said bore. Consequently, the straight longitudinal edges 24 of the flat 23 of the cutter will be likewise located in a given position of rotation of the cutter, and as the screw 20 is tightened to final adjustment, the edges 24 will, under pressure of said screw, tend to bind against the wall of the bore 17 of the sleeve 16. A triangular three point tension between the screw 20 and the edges 24 of the flat 23 of the cutter will thus be exerted on the cutter for locking the cutter in given located set position on the eccentric sleeve 16. Furthermore, as will now be appreciated, the cutter 21 may be readily removed and a fresh cutter substituted in lieu thereof, when the edges 24 of the flat 23 of the fresh cutter in conjunction with the flat 25 of said fresh cutter and screw 20 will serve to rotatively locate the fresh cutter in the exact set rotated position formerly occupied by the cutter removed.

In the set position of the cutter 21 in the eccentric adjusting sleeve 16, the slot 22 of the cutter is disposed at a right angle to the slot 14 in the bottom wall of the socket 13, and confined between the inner end of the cutter and said bottom wall is a floating circular locking key 29 provided centrally with an opening 30 of a diameter to accommodate eccentric dislocation of the key so that at all times oil may freely flow through said opening to the oil duct 28 of the cutter. The key 29 is provided at its periphery with a groove 31, and seated in said groove to grip the key is a resilient ring 32, preferably of suitable synthetic material. The ring 32 is of such cross sectional diameter that the ring is compressed somewhat by the wall of the socket 13, so that the ring will normally center the key in said socket.

At one side thereof the key 29 is provided with spaced diametrically disposed lugs 33 which are slidably received in the slot 14 in the bottom wall of the socket 13, while at its opposite side the key is provided with like spaced diametrically disposed lugs 34 arranged in a plane at a right angle to the plane of the lugs 33 and which are slidably received in the slot 22 of the cutter 21. If found desirable, the side walls of the slot 22 may be beveled or flared at their outer longitudinal margin to facilitate the entrance of the lugs 34 into said slot. Also, if desired, the outer longitudinal margins of the lugs may be beveled.

As will be perceived from the foregoing, the key 29 will provide a rigid connection between the inner end of the cutter 21 and the tool body 10 solidly locking the cutter against rotation independently of the body. However, as will also be understood, the lugs 33 of the key will shift in the slot 14 in the bottom wall of the socket 13 to permit movement of the key in said socket, while the lugs 34 of the key in conjunction with the slot 22 of the cutter 21 will permit movement of the key relative to the cutter or vice versa and accommodate the travel of the cutter as the eccentric sleeve 16 is rotatably adjusted. Adjustable through the wall of the head 11 of the tool body 10 to engage the sleeve is a set screw 35 for locking the sleeve in set adjusted position.

Figure 12:
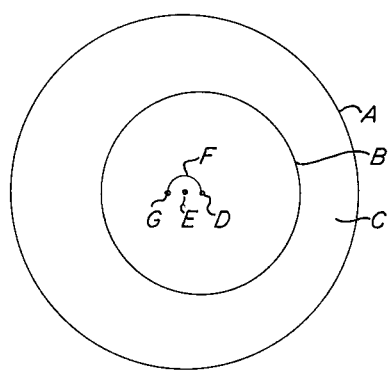
FIG. 12 is a diagram illustrating the radial positions assumed by the cutter in the adjusting operation.

After the stop screw 20 has been loosened, the eccentric sleeve 16 may, as will now be explained, be manually rotated to adjust the cutter 21 radially of the axis of the tool body 10, and in this connection it is to be noted that, as previously indicated, the present tool is intended to accomplish, after the tool has been mounted in roughly adjusted operative position, only a few final thousandths of an inch in the radial disposition of the cutter. Thus, in any event, the maximum radial travel of the cutter will not be great, say thirty or forty thousandths of an inch more or less, although, however, the tool may well be constructed to embody a much larger radial adjustment of the cutter. Since the small measurements indicated are difficult to bring out in the drawings in any view showing structure, I have, in FIGURE 12 incorporated a greatly exaggerated diagram.

Referring now to the diagram, the circle A indicates the wall of the socket 13, and the circle B the wall of the bore 17 in the eccentric sleeve 16, which sleeve is indicated at C. The center of the circle B is indicated at point D, which may also be designated as the axis of the cutter 21. The center of the circle A is indicated at point E, which, as will be understood, may also be designated as the axis of the socket 13 of the head 11 as well as the axis of the tool body 10. For the purposes of the diagram, the distance from point D to point E will be assumed to be ten thousandths of an inch. Furthermore, in the diagram, the eccentric sleeve C is assumed to be at the end of its throw in a clockwise direction with the low side of the sleeve on the right, as viewed in the diagram, and the high side of the sleeve on the left. Thus, in the position of the eccentric sleeve shown, the axis of the cutter, or point D, is shifted radially to the right of point E, or the axis of the tool body, ten thousandths of an inch in the instance taken.

It will now be further assumed that the eccentric sleeve C is turned in a counter clockwise direction to the end of its throw. In this assumed position of the sleeve, the high side thereof will be on the right, as viewed in the diagram, while the low side of the sleeve will be disposed on the left. Thus, since the sleeve will turn about an axis represented by the point E, the axis of the cutter 21 will swing from the point D in the arc F to the point G. Accordingly, since, in the instance taken, the distance from point D to point E is ten thousandths of an inch, it will be seen that the axis of the cutter will be shifted radially to the left of point E, or the axis of the tool body, ten thousandths of an inch.

In the position of the eccentric sleeve C shown in the diagram, the points D, E, and G all lie in a plane with the slot 14 in the bottom wall of the socket 13 of the head 11 and, for convenience of description, the slot will be said to be disposed horizontally. The lugs 33 of the locking key 29 which are engaged in the slot 14 will thus be disposed horizontally, while the lugs 34 of the key which are engaged in the slot 22 of the cutter 21 will be disposed vertically. Thus, since the locking key 29 is normally centered with respect to the point E of the diagram and since the point D is spaced with respect to the point E, in the instance taken, ten thousandths of an inch, the locking key will be held by the cutter 21, in the position of the parts above outlined, ten thousandths of an inch off center with respect to the point E.

As will be perceived, the outlined eccentric dislocation of the locking key 29, as described in the foregoing, will continue as the axis of the cutter is swung in the arc F, and it is now to be noted that said eccentric dislocation of the locking key will be absorbed by compression of the resilient centering ring 32. The particular function of the ring will thus now appear. If, at any position of rotative adjustment of the eccentric sleeve 16, the cutter 21 is removed therefrom for any reason, the ring 32 will immediately return the locking key 29 to centered position with respect to the point E of the diagram. Accordingly, assuming that a fresh cutter is to be installed, the slot 22 of the fresh cutter may readily locate the lugs 34 of the key and engage therewith as the fresh cuter is pushed into the bore 17 of the eccentric sleeve to operative position, and, as previously noted, said lugs as well as the walls of said slot may be beveled to facilitate the installation of the cutter. In the absence of the centering ring 32, the locking key 29 would shift to such an extreme eccentric position that, once the cutter 21 was removed, it could not be again installed, nor could a fresh cutter, without taking the tool apart.

The axial adjusting mechanism for the cutter 21 will now be described.

Slidably fitting in the bore 15 of the tool body 10 is a tubular push rod 36 resting at its forward end against the locking key 29, and screwed into the chamber 12 of the body to abut the rear end of said rod is a follower sleeve 37. The sleeve 37 is provided at its outer end with an axial socket 38, and adjustable through the wall of the socket is a set screw 39. Leading from the socket 38 through the sleeve 37 is an axial duct 40. Thus, oil may flow from the socket 38 through the duct 40, through the tubular push rod 36, through the opening 30 of the locking key 29, and through the duct 28 of the cutter 21 to the cutting prongs 26 and 27.

As will now be seen, the stop screw 20 may be loosened to release the cutter 21 for endwise movement, when the sleeve 37 may be manually turned for adjusting the cutter axially forward, and adjustable through the wall of the chamber 12 of the tool body 10 is a set screw 41 for locking the sleeve in adjusted position. As shown in the drawings, the sleeve 37 may be provided with suitable graduations to guide the operator when adjusting the sleeve. It is further to be noted that axial adjustment of the cutter will not alter or affect the position of radial adjustment of the cutter, nor will radial adjustment of the cutter affect or alter the position of axial adjustment of the cutter.

In FIGURE 13 of the drawings, I have shown a portion of a conventional automatic boring machine with the tool of the present invention mounted in operative position thereon. The usual pentagon of the machine is indicated at 42, and the usual tool holder at 43. The tool holder is adjustably secured to the pentagon by bolts 44, while the cap of the tool holder is adjustably secured to the base of said holder by bolts 45. Secured in the socket 38 of the sleeve 37 by the set screw 39 is the usual flexible oil supply pipe 46 of the machine for supplying oil to the tool.

Under prevailing practice, it is necessary to loosen the bolts 44 of the tool holder 43 in order to adjust the holder and boring tool axially of the pentagon, while, also, said bolts must be loosened to permit one or more shims to be inserted beneath the tool holder in order to adjust the tool radially of the pentagon. Furthermore, the bolts 45 of the tool holder 43 must be loosened in order to axially adjust the boring tool of the holder independently of said holder. The adjustments described have, in practice, proven very difficult for precision work as well as time consuming. In contrast, as will be understood in view of the foregoing description, the radial and axial adjusting mechanisms of the present invention may, after the tool has been roughly adjusted on the pentagon 42 by the conventional procedures above outlined, be selectively manipulated quickly and easily to accomplish a fine precision adjustment of the cutter.

Having thus described my invention, I claim:

1. A boring tool including a tool body having an axial bore therethrough and provided with a socket in its forward end, an eccentric sleeve rotatably mounted in said socket, a cutter mounted upon said sleeve and shiftable thereby radially of the longitudinal axis of the body, said cutter having a bore extending therethrough from one end thereof to the other, and means disposed between the inner end of the cutter and the bottom wall of the socket and in axial abutting relationship to the cutter to coact with the cutter and the tool body for resisting torsional stress on the cutter, and said means having a bore therethrough in communication with the bores in the tool body and the cutter, a tubular push rod slidably mounted in the bore in the tool body and in communication with the bore in said means and operatively coacting at its forward end with the means, and further means rotatably adjustable on the rear end of the tool body to react with the rear end of said rod and operable to push the rod forwardly and adjust the cutter axially forwardly, said further means having a bore therethrough in communication with the bore in said tool body for flow of oil from said further means through said tool body, the means and the cutter.

2. A boring tool including a tool body provided at its forward end with a socket, an eccentric sleeve rotatable in said socket and provided with an eccentric bore, a cutter removably mounted in said bore and movable radially relative to the longitudinal axis of the tool body as said eccentric sleeve is rotated, a floating key disposed in said socket, said floating key being freely axially and radially movable relative to the cutter and the tool body, and means projecting from said floating key and engageable with said cutter and tool body and locking the cutter against rotation independently of the tool body, said floating key being movable by the cutter to accommodate the radial travel of the cutter as the cutter is shifted and being held off center in said socket by rotation of the eccentric sleeve, and resilient means carried by said floating key and coactive with the wall of said socket and operable to center the key relative to the longitudinal axis of the tool body when the cutter is removed.

3. A boring tool in accordance with claim 2, wherein said floating key is of circular shape and is formed with a peripheral groove and said resilient means is mounted in said peripheral groove.

References Cited in the file of this patent

UNITED STATES PATENTS

| 1,104,989 | Hanson | July 28, 1914 |
| 2,470,218 | McNamara | May 17, 1949 |
| 2,558,815 | Briney | July 3, 1951 |
| 2,626,812 | Jones | Jan. 27, 1953 |
| 2,681,673 | Mackey | June 22, 1954 |
| 2,849,902 | De Vlieg | Sept. 2, 1958 |

FOREIGN PATENTS

| 2,931 | Great Britain | 1885 |